Dec. 16, 1941.                J. WISS                    2,266,113
                ADJUSTABLE CYLINDER BORING FIXTURE
                    Filed July 30, 1940          2 Sheets-Sheet 2
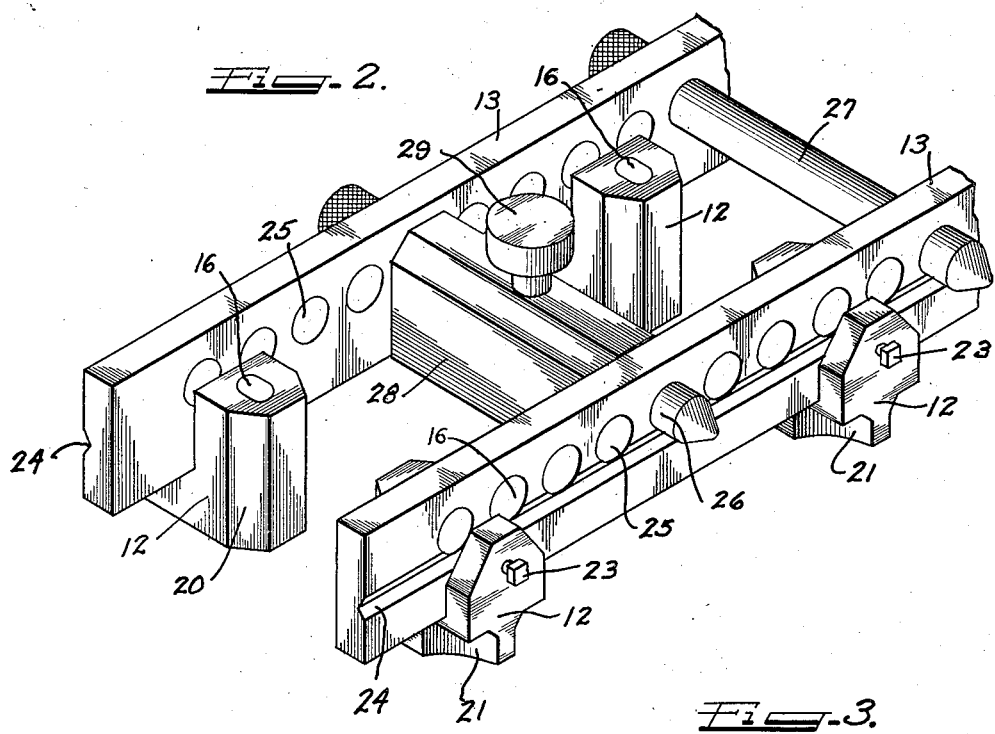
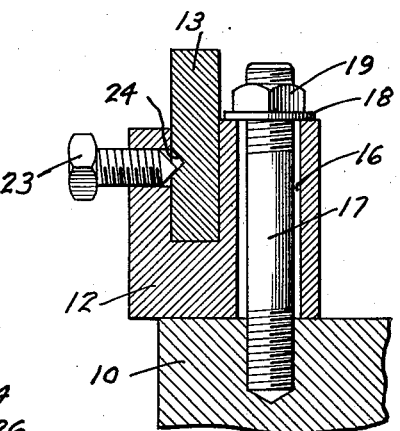
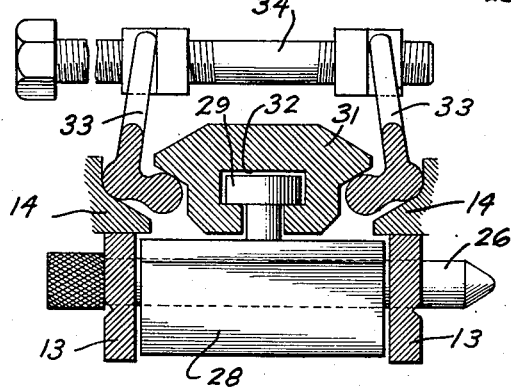
Inventor
JAMES WISS.

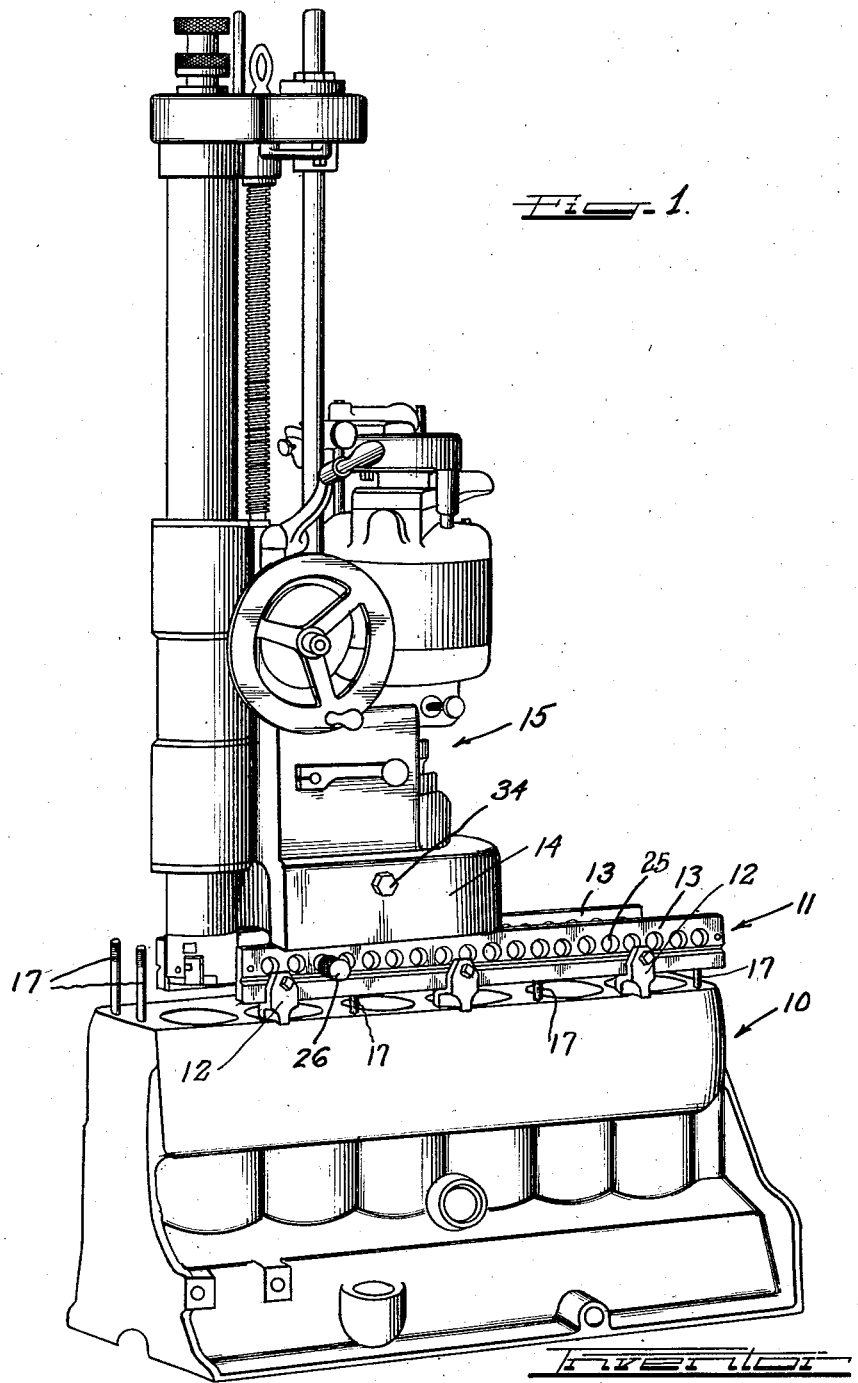

UNITED STATES PATENT OFFICE 2,266,113

ADJUSTABLE CYLINDER BORING FIXTURE

James Wiss, Chicago, Ill.

Application July 30, 1940, Serial No. 348,471

11 Claims. (Cl. 77—62)

This invention relates to cylinder boring equipment, and one of its principal objects is to provide a fixture for quickly and accurately mounting a cylinder boring machine upon different cylinder blocks without it being necessary to remove the valves and cylinder head studs from the cylinder blocks.

In recent years, portable cylinder boring machines have appeared upon the market, these machines comprising a flat base adapted to be secured on the flat surface on the top of a cylinder block and having a vertical spindle carrying a boring tool and adapted to be projected down into a cylinder to be bored. In using a boring machine of this type, it is generally necessary to remove all of the valves and all of the cylinder head studs so as to leave the top of the cylinder block unobstructed for the cylinder boring machine to rest upon.

Fixtures have been used to eliminate the necessity of removing the valves and cylinder head studs, these fixtures comprising blocks adapted to be bolted on to the cylinder in place of the cylinder head and having a flat upper surface upon which the boring machine can be seated. These fixtures are quite satisfactory in operation, but they have the great disadvantage that each fixture can be employed with only one make and model of motor and that different fixtures have to be provided for all of the different models and makes of motors to be rebored.

One of the principal objects of the present invention is to provide a fixture for supporting the base of a boring machine above the valves and cylinder head studs, the fixture being adjustable so that it can be employed on practically any make or model of motor. This makes it necessary for an engine rebuilding shop to be provided with only one fixture for each cylinder boring machine instead of having to have a different fixture for every make and model of automobile or truck that might come into the shop to have the cylinders rebored.

One of the principal features of the present invention is the provision of separate pedestals that can be secured on the top of the block by the cylinder head studs, irrespective of the exact spacing of the studs, and which serve to support a pair of longitudinal base bars on the top of which the boring machine can be seated.

Another feature of the present invention is that the entire fixture for securing the boring machine in place is located above the top of the cylinder block, as contrasted to the previous means of securing the boring machine, which involve a toggle fitting down into one of the cylinders adjacent the cylinder being rebored and which made it necessary to remove the piston and rod from an extra cylinder in jobs where only one cylinder is to be rebored.

Another feature of this invention is that the fixture is secured to the block without appreciably straining or distorting the block. This is a material improvement over the ordinary way of securing the boring machine to the block by a toggle hooked under the lower end of a cylinder next to the one being bored, which distorts the block and lends to slight inaccuracies in the work.

These and other objects and features of the invention may be more readily understood from the following description and claims and the accompanying drawings, in which:

Figure 1 is a perspective view showing one of the preferred forms of the invention in use;

Figure 2 is an isometric view of the fixture itself, a portion of the fixture being broken away to permit the remainder to be shown on a larger scale;

Figure 3 is a cross-section through a portion of the fixture; and

Figure 4 is a cross-sectional view through the fixture and a portion of the boring machine, showing how the boring machine is secured to the fixture.

The particular form of the invention shown in the drawings has, for the purpose of simplicity, been shown as mounted upon a bare cylinder block 10 which is shown removed from a chassis, but it is to be clearly understood that the invention is ordinarily used upon the engine or cylinder block 10 without removing it from the chassis of which it forms a part. The fixture 11, which forms the invention, comprises a plurality of pedestals which fit on top of the block 10 and carry a pair of rails or space bars 13 upon which the base 14 of the boring machine 15 is seated.

The pedestals 12 are preferably six in number, three being used to support each rail 13, and they are provided with holes 16 to receive the cylinder head studs 17 by which they are secured to the block 10. The holes 16 are preferably elongated or oval in order to permit the three pedestals supporting one rail 13 to be lined up exactly, irrespective of any deviation from a straight line of the three studs 17 chosen for fixing the pedestals 12. A washer 18 and a nut 19 fitting the cylinder head stud 17 are provided for each of the pedestals 12.

Attention is particularly directed to the shape of the pedestal 12 clearly shown in Figure 2. The front vertical corners of each pedestal 12 are champfered off, as indicated by the reference character 20, so that the nose of the pedestal 12 can project between adjacent cylinders without overhanging the cylinder bore and being in the way when it is desired to bore those cylinders. It will also be noted that the base of each pedestal 12 is undercut at each side at the rear, as shown at 21, in Figure 2. These undercuts 21 permit the pedestals to be located between the valves of adjacent cylinders and make it unnecessary to remove the valves in order to mount the fixture on the block.

The rails 13 fit into slots in the top of the pedestals 12 and are held in place by set screws 23 engaging V-grooves 24 in the sides of the rails. As may be seen from Figure 3, the center of the set screw 23 is located slightly below the center of the V-groove 24, the amount of offset being exaggerated in the drawings so that it may be readily apparent. Because of this offset, the set screw 23 engages the lower sloping side of the groove 24 and wedges or cams the rail 13 tightly against the bottom of the slot in the pedestal 12.

It will be noted that the two rails 13 are each provided with a series of holes 25 spaced uniformly along their lengths. The holes 25 provide a number of positions in which an anchor pin 26 may be located so that the boring machine 15, which fastens to the anchor pin 26 by a mechanism described below, can be located in the proper positions for boring all of the cylinders. In order that the anchor pin 26 may be readily inserted in the hole 25, it is necessary that the two rails 13 be located accurately with respect to each other. This is accomplished by providing one or more aligning pins 27 and placing them through the holes 25 in the two rails 13 before the set screws 13 which clamp the rails to the pedestals and the nuts 19 which clamp the pedestals to the cylinder block are tightened. Then, when the set screws 23 and the nuts 19 are tightened they will hold the rails 13 in the accurate alignment which they are forced to assume by the aligning pins 27.

The anchor pin 26 may be made of the same diameter as the aligning pins 27, but I have found that this occasionally results in the anchor pin 26 being slidable into the holes 16 with some friction. The anchor pin 26 is therefore preferably made a few thousandths of an inch smaller than the aligning pins 27, with the result that it is always readily slidable into position.

The anchor pin 26 extends through an anchor block 28 located between the rails 13 and having an anchor button 29 formed integrally with it. The anchor button 29 projects up above the level of the top of the rails 13 and is adapted to be engaged by a clamping device forming a part of the boring machine 15 and shown in section in Figure 4. This particular form of clamping device comprises a clamping means 31 extending longitudinally of the boring machine and having a T-slot 32 adapted to receive the anchor button 29. The clamping means 31 is supported by two bell cranks or levers 33 which are fulcrumed upon the base 14 of the boring machine and which are operated simultaneously by a right and left-hand threaded bolt 34 extending across the base 14.

It may be seen from Figures 2 and 4, that the upper edges of the anchor block 28 are champfered and that there is a considerable excess of metal on the bottom of the anchor block over that required for strength. As a result of this, the center of gravity of the anchor block is below the axis of the anchor pin 26 so that the anchor block naturally swings to its operative position with the anchor button 29 on top. This feature facilitates the setting up of the boring machine 15, for it allows the base 14 of the machine to be slid on the rails 13 over the anchor block 28, the anchor block tipping over to allow the base 14 to pass, and the anchor block then automatically swings back up to operative position while the operator is using both hands to manipulate the machine.

From the above, it will be seen that I have provided a simple, rigid and comparatively inexpensive adjustable fixture which will permit a portable cylinder boring machine to be secured in working position on the cylinder block of practically every engine without it being necessary to remove the cylinder head studs or the valves. In many engines, the cylinder head studs are rusted into place, and some of them cannot be removed except by being drilled out, which necessitates retapping of the hole and redrilling of the cylinder head to take an oversize stud. My device avoids all of this. In other cases, such as where a single cylinder has been scored and is to be rebored and provided with a liner or sleeve while the other cylinders are to remain untouched, the time which would be required to remove the cylinder head studs and the valves to enable the job to be done in the old way is a large fraction of the total time for the job. With the use of my device, a very large percentage reduction in the time taken for the job is gained.

While I have shown only one specific form of my invention it is, of course, to be understood that this is shown only by way of example and that many modifications and changes may be made without departing from the true spirit of the invention. The particular arrangement of anchor button 29 which I have shown is designed for the particular boring machine shown in the drawings and, obviously, other arrangements may be necessary for other types of boring machines. Also, some of the features of the invention may be omitted while others are used, such as by substituting an anchor block which hooks under the side rails 13 instead of using the more convenient anchor block and anchor pin which I have shown. Various other changes will occur to the skilled mechanic. However, all of such modified constructions are to be considered as embodiments of my invention as long as they fall within the true spirit of the invention and within the scope of the following claims.

I claim as my invention:

1. An adjustable fixture for portable cylinder block boring machines, comprising a plurality of separate pedestals adapted to be fixed on the upper surface of a cylinder block, a pair of rails, and means for fixing said rails to said pedestals.

2. An adjustable fixture for portable cylinder block boring machines, comprising a plurality of separate pedestals, each of said pedestals having a vertical hole therein for receiving a cylinder head stud and having a transversely extending slot, a pair of rails, and means for fixing said rails in said slots in said pedestals.

3. In an adjustable fixture for portable cylinder block boring machines, a pedestal for supporting a rail upon which said machine is adapted to be secured, said pedestal having a narrow nose portion adapted to project between the openings of adjacent cylinder bores.

4. In an adjustable fixture for portable cylinder block boring machines, a pedestal for supporting a rail upon which said machine is adapted to be fixed, said pedestal being undercut at both sides near the back to provide a narrow heel portion adapted to fit between the valves of adjacent cylinders.

5. In an adjustable fixture for portable cylinder block boring machines, a pedestal for supporting a rail upon which said machine is adapted to be seated, said pedestal having a vertical hole through which a cylinder head stud may extend, said hole being elongated in a direction substantially perpendicular to said rail whereby the distance between said rail and said stud may be adjusted.

6. In an adjustable fixture for portable cylinder block boring machines, a pedestal having an upwardly facing slot therein, a rail seated in said slot and having a substantially horizontal V-groove in one side, and clamping means in said pedestal bearing against the lower side of said V-groove.

7. In an adjustable fixture for portable cylinder block boring machines, a pedestal adapted to be fixed on the upper surface of a cylinder block and having an upwardly facing slot therein, a rail seated in said slot and having a substantially horizontal V-groove on one side, and a substantially horizontal set screw in said pedestal, said set screw having a pointed end projecting into said V-groove and the axis of said set screw being lower than the center of said V-groove.

8. An adjustable fixture for portable cylinder block boring machines, comprising a pair of rails upon which the machine is adapted to be seated, means for fixing said rails to a cylinder block, an anchor button adapted to be engaged by clamping means in said machine, and means for securing said anchor button to said rails.

9. An adustable fixture for portable cylinder block boring machines, comprising a pair of rails upon which the machine is adapted to be seated and having horizontal apertures therethrough, means for fixing said rails to a cylinder block, an anchor block having an anchor button adapted to be engaged by clamping mechanism within said machine, said anchor block having an aperture therethrough, and an anchor pin adapted to extend through said apertures in said rails and said anchor block for securing said anchor block and said anchor button to said rails.

10. In an adustable fixture for portable cylinder block boring machines, an anchor pin, an anchor block rotatably mounted on said anchor pin and carrying an anchor button adapted to be engaged by clamping mechanism within said machine, the center of gravity of said anchor block and said anchor button being substantially below the axis of said anchor pin.

11. An adjustable fixture for portable cylinder block boring machines, comprising a pair of rails upon which the machine is adapted to be seated, said rails each having a series of horizontally cylindrical holes therethrough, means for fixing said rails to a cylinder block, an anchor pin extended through a hole in one rail and a hole in the other rail, an anchor block mounted on said anchor pin between said rails and having an anchor button adapted to be engaged by clamping mechanism within said machine, and an aligning pin adapted to fit simultaneously into a hole in one rail and a hole in the other rail, the clearance of said aligning pin in said holes being less than the clearance of said anchor pin in said holes.

JAMES WISS.